United States Patent [19]

Kreth et al.

[11] Patent Number: 5,738,814
[45] Date of Patent: Apr. 14, 1998

[54] METHOD OF MANUFACTURING OF LACQUER-COATED EXTRUSION PRODUCTS

[75] Inventors: Norbert Kreth, Minden; Reinhard Witt, Bad Oeynhausen; Helmut Wiech, Gelsenkirchen, all of Germany; Berrie Penney, Henley on Thames, Great Britain

[73] Assignee: Battenfeld Extrusionstechnik GmbH, Bad Oeynhausen, Germany

[21] Appl. No.: 637,792

[22] PCT Filed: Oct. 28, 1994

[86] PCT No.: PCT/EP94/03559

§ 371 Date: Jul. 10, 1996

§ 102(e) Date: Jul. 10, 1996

[87] PCT Pub. No.: WO95/12483

PCT Pub. Date: May 11, 1995

[30] Foreign Application Priority Data

Nov. 5, 1993 [DE] Germany ............... 43 37 832.3

[51] Int. Cl.[6] .................. B29C 47/06; B29C 47/20
[52] U.S. Cl. .................. 264/171.26; 156/244.13; 264/171.14; 264/173.16; 264/173.18; 425/462
[58] Field of Search .............. 264/171.14, 171.12, 264/173.16, 173.18, 171.26, 514, DIG. 69; 156/244.13, 244.14; 425/462

[56] References Cited

U.S. PATENT DOCUMENTS

| 3,136,676 | 6/1964 | Fisch ............... 264/171.12 |
| 3,923,743 | 12/1975 | Quiring et al. ............... 260/75 NT |
| 3,965,845 | 6/1976 | Scheiber ............... 118/66 |
| 4,182,601 | 1/1980 | Hill . |
| 4,189,520 | 2/1980 | Gauchel . |
| 4,510,007 | 4/1985 | Stucke ............... 264/171.12 |
| 4,900,800 | 2/1990 | Halpaap et al. ............... 528/66 |
| 5,026,451 | 6/1991 | Trzecieski ............... 156/244.13 |
| 5,063,615 | 11/1991 | Chernuchin et al. ............... 2/338 |

FOREIGN PATENT DOCUMENTS

| 0548549 | 6/1993 | European Pat. Off. . |
| 0604907 | 7/1994 | European Pat. Off. . |
| 2265035 | 1/1976 | Germany . |
| 2554239 | 6/1977 | Germany ............... 264/171.12 |
| 1188317 | 7/1989 | Japan . |
| 2247640 | 3/1992 | United Kingdom . |

*Primary Examiner*—Jeffery R. Thurlow
*Attorney, Agent, or Firm*—Anderson Kill & Olick, PC

[57] ABSTRACT

A method of manufacturing of continuous, at least two-layer products having an upper layer formed of a lacquer material, the method having the steps of providing an apparatus including a co-extrusion tool having first and second conduits, respectively, with the first and second inlets, with the second conduit circumscribing the first conduit, and a merging section in which flows exiting the first and second conduits merge, and first and second extruders connected with the first and second inlets, respectively, and simultaneously injecting melts of base and lacquer materials with the first and second extruders, respectively, through the first and second conduits, respectively, so that on at least two-layer product exiting the merging section of the co-extrusion tool and having an upper lacquer layer, is produced in a single step.

5 Claims, 3 Drawing Sheets

METHOD OF MANUFACTURING OF LACQUER-COATED EXTRUSION PRODUCTS

BACKGROUND OF THE INVENTION

1. Field of the Invention

The invention relates to a method and a device for a continuous or batch extrusion of continuous, consisting of at least two layers, products such as pipes, profiles, plates and foils, as well as the use of the melts co-extruded with the device.

2. Description of the Prior Art

Co-extrusion methods and devices on tools for producing multi-layer products and semifinished goods by extrusion or pultrusion, in the latter case the extrusion process is not interrupted, e.g., a continuous tubing, which is obtained by drawing, are sufficiently well known. At that, in addition to a main extruder, as a rule, a second extruder (additional injector) is used, with which second extruder one or both main surfaces of a product, e.g., a casement section, are covered with a cover layer, e.g., PVC or polymethylmethacrylat (PMMA) when the above-mentioned casement section is covered.

In order to obtain a decorative effect and to solve technical problems, the products, which are produced in the above-discussed manner, have their outer surfaces subjected to a specific treatment to give the products a corresponding appearance or particular functional characteristics. To this end, they are painted, lacquered or provided with a decorative layer, e.g., by flock coating. The treatment of the outer surfaces should, e.g., insure that the outer layer of a multi-layer profile, e.g., its transparence, which may be the case with water absorption, is not distinctly changed, i.e., the products are conditioned by the surface treatment before their further processing. When, e.g., during production of the casement sections, a co-extrusion process of depositing a PMMA on PVC, the oldest of the used methods of surface treatment, is used, a following painting or lacquering of the products is still necessary. Because the application of paint on the sections should be conducted with a minimal speed which far exceeds the section extrusion speed, an "off-line" operation is necessary, wherein one painting device can be used for treating sections from several extrusion lines. The paint is then applied in a continuous apparatus including corresponding stations for rinsing, drying and painting. The application of paint itself is effected indirectly by a rubber roller the advantage of which consists in that the surfaces, which are not absolutely flat, can be flawlessly covered. When the above-described painting apparatus is used for painting casement sections, the decorative layer is obtained, e.g., with the following steps:

a) Priming, b) Application of paint to obtain a decorative pattern, c) Application of a colorless uv-protective lacquer.

The thickness of the layer amounts to about from 20 to 30 microns and, in comparison with an application of a film, a simpler section change is possible. In order to obtain such surface-treated products, increased hardware investments become necessary.

SUMMARY OF THE INVENTION

Accordingly, an object of the invention is a method and a device of the above-mentioned types, with which by extrusion-continuous (pultrusion) or batch, lacquer-coated products, which are improved by simple means, can be produced.

This object is achieved, with respect to the method, by producing at least one layer from lacquer which is co-extruded together with the base material of which the product is made. A two-layer product may consist of, e.g. calciumcarbonate, i.e., $CaCo_3$, reinforced or filled with glass or carbon fibers-base material, and of an outer lacquer layer, wherein the lacquer is, e.g., a plastic material having characteristics of a lacquer. As it was surprisingly determined by experiments, a lacquer layer can be obtained by an extrusion process. A co-extruded three-layer product can, e.g., have a conventional plastic material as inner layer, an intermediate layer of a colorless lacquer, and an outer color lacquer layer.

At that, the use of a thermoplastic powder lacquer is recommended. Nonetheless, the use of liquid lacquer is not excluded. However, with the use of a thermoplastic powder lacquer, which can also be available in granules, the solvent can be dispensed with, which makes the solid lacquer environment-friendly. As a base material for a thermoplastic powder lacquer, in particular, thermoplast can be used. German Publication No. 4,204,266A1 discloses use of suitable thermoplastic powder lacquer for covering can welds and, in particular, for forming the inner layer of containers. The powder lacquers, which are described in this publication, can be used, e.g., in the extrusion process according to the present invention.

In accordance with the present invention, a lacquer can be applied to or deposited on a partial region of a base layer (base material). This can be effected, e.g., when axially extending circumferential segments formed as color strips should serve for identification purposes.

According to an embodiment of the invention, at least one of the outer lacquer-covered layers of an extruded products is formed from a recycling material. Here, the recycled material can be formed of comminuted fiber-shaped particles of the total range of recycled plastic materials so that to close the use cycle of valuable materials and to be able to re-use these materials. As a raw material, vehicle parts, parts of electrical machines and other can be used, whereby long-lasting valuable raw materials are saved and, simultaneously, the amount of waste products is reduced. At that, pure plastic materials, e.g., casement sections are preferred to non-pure plastic materials, e.g., domestic waste which requires a substantial reprocessing.

According to further development of the invention, it is contemplated to re-use thermoplastic powder lacquer components which are contained in a recycled material and which can be made suitable for use in the extrusion process by known additives.

A device for effecting the process can include at least one extruder, a melting device, and a device for merging at least two melt flows of which one consists of a thermoplastic powder lacquer. The melting device can here be an extruder (single screw), a stirring device or the like, in the thermoplastic powder lacquer agglomerates and is melted out. A co-extrusion adapter or a co-extrusion tool can be used for merging two melt flows. Advantageously, a melt pump is located downstream of the melting device and which provides for the required pressure built-up. The lacquer, which liquifies in the extruder, is fed by the pump into a mold (i.e. tool). According to the invention, it is contemplated that the co-extruded melt is used for sheathing of (steel) pipes or cables, so that these products (pipes or cables) have at least a two-layer surface the outer layer of which is formed by a lacquer, in particular, thermoplastic lacquer. For sheathing, suitable tools can be used. E.g., for sheathing of pipes, a known wide slot nozzle, which is used in the production of plates, can be used.

BRIEF DESCRIPTION OF THE DRAWINGS

Further features and advantages of the invention will become apparent from the claims and the following detailed description of an embodiment of the invention shown in the drawings. In the Drawings:

DETAILED DESCRIPTION OF THE PREFERRED EMBODIMENTS

Figure 1:
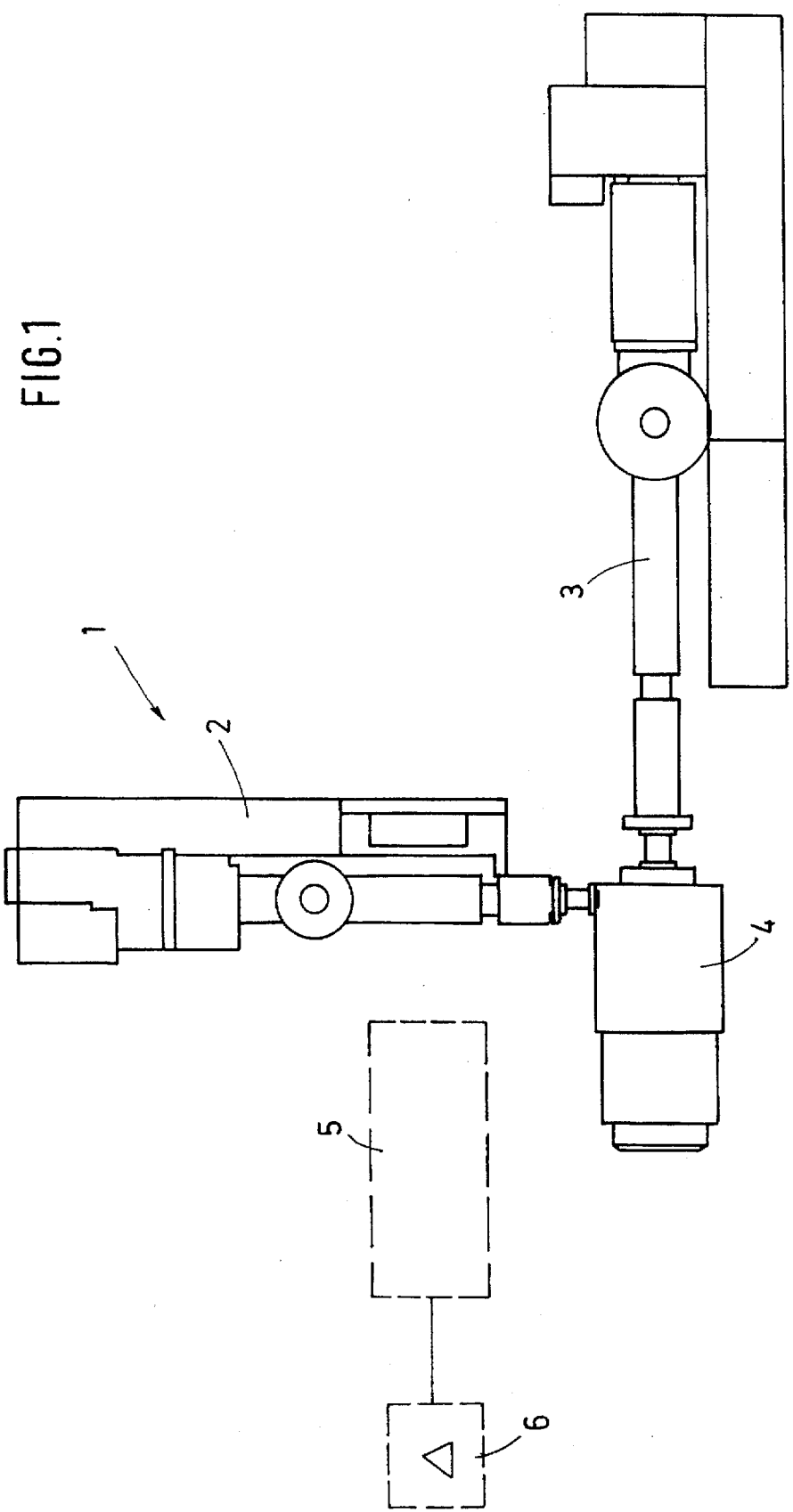
FIG. 1 shows a production unit for producing multilayer products with an outer layer formed of lacquer.
Figure 2:
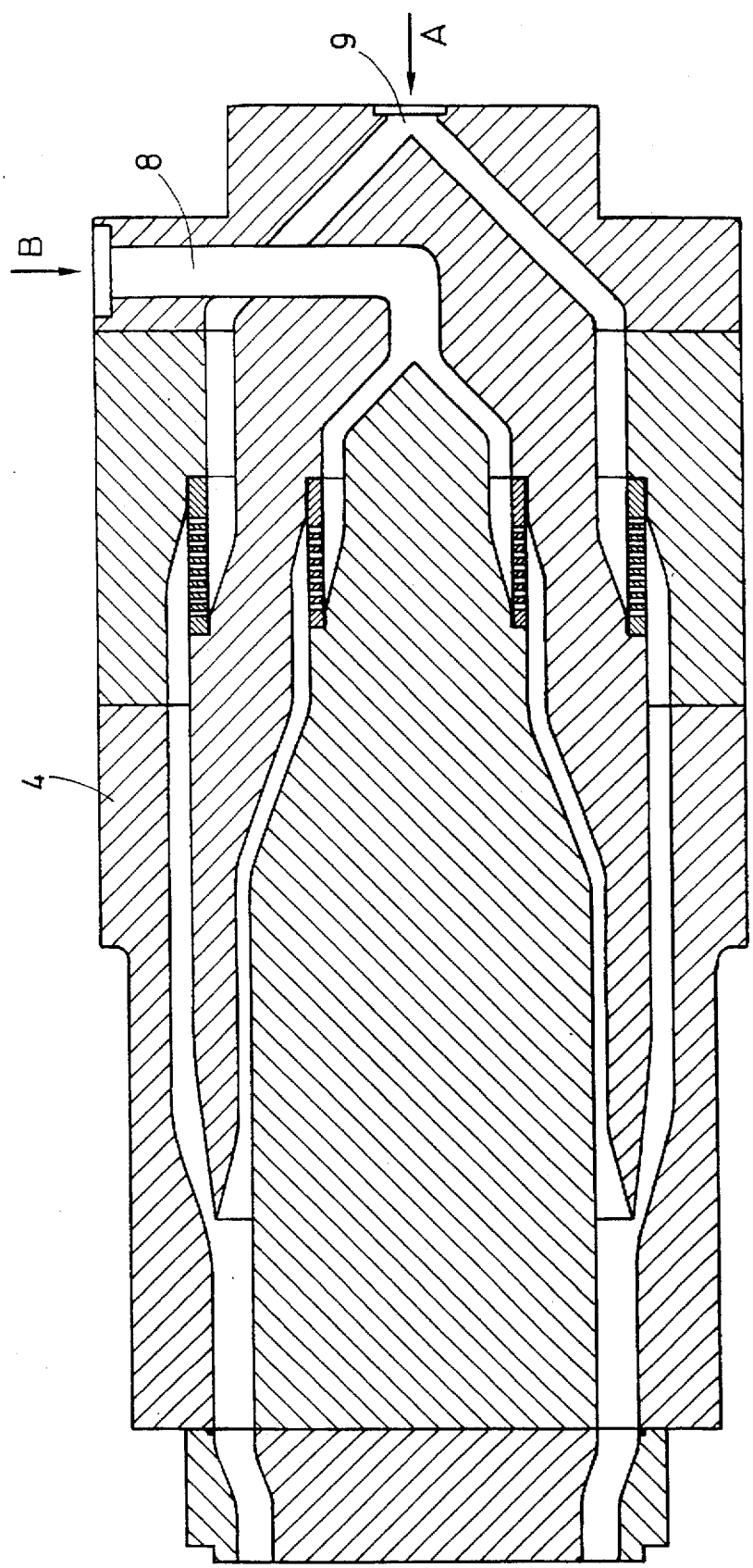
FIG. 2 shows a cross-section of a co-extrusion tool.

A production unit 1 for producing tubes, profiles, plates, foils, etc., includes, according to FIG. 1, a main extruder 2, a co-extruder (auxiliary injector) 3 and a conventional co-extrusion tool 4 shown separately in FIG. 2. The main extruder 2 and the co-extruder form part of conventional apparatus for effecting co-extrusion of at least two-layer products and require no detailed description.

If a melting device 5, shown schematically in FIG. 1 with dash lines, in a form of a single screw, is set in for agglomeration and melting of a thermoplastic powder lacquer, a melt pump 6 can be provided downstream thereof for building-up pressure necessary for effecting co-extrusion and for delivering the liquified lacquer into a mold. In this case, the melting apparatus 5, together with the melt pump 6, are arranged in front of the mold (e.g., a co-extrusion tool 4) instead of the co-extruder 3.

Figure 3:
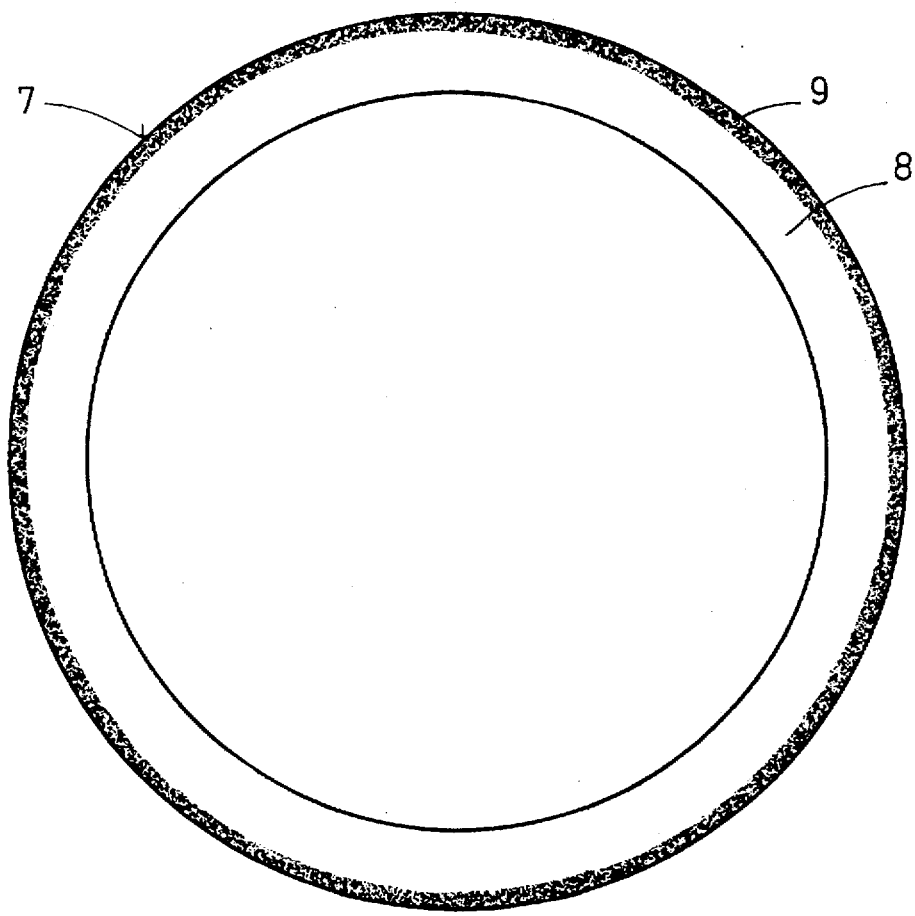
FIG. 3 shows a cross-section of a two-layer product having a form of a tube and produced with the apparatus shown in FIG. 1.

The product, which is obtained with the production unit 1 shown in FIG. 1 and which is shown in FIG. 3, represents a two-layer pipe 7 the base material of which 8 forms the inner layer which is covered with an outer layer of a thermoplastic powder lacquer 9. The two-layer pipe 7 is obtained, in the example shown, by feeding, into the co-extrusion tool 4, the base material 8 from the main extruder 2 through the connection B and by feeding the thermoplastic powder lacquer 9 from the co-extruder 3 through the connection A.

A continuously extruded pipe, having a cross-section shown in FIG. 3, exists at the left front end of the co-extrusion tool 4, downstream of which there are provided a calibration device and a cooling stretch in which the pipe 7 is cooled to such an extent that no thermoelastic deformation is possible any more.

We claim:

1. A method of manufacturing of continuous, at least two-layer products having an upper layer formed of a lacquer material by one of continuous extrusion and batch extrusion, the method comprising the steps of:

providing an apparatus including a co-extrusion tool having a first inlet and a first conduit for conducting at least one base material and communicating with the first inlet, a second inlet and a second conduit for conducting a lacquer material and communicating with the second inlet, the second conduit circumscribing the first conduit, and a merging section in which flows exiting the first and second conduits merge, and first and second extruders connected with the first and second inlets, respectively, for injecting through the first and second inlets a melt of the base material and a melt of the lacquer material, respectively; and simultaneously injecting the melts of the base and lacquer materials with the first and second extruders, respectively, through the first and second conduits, respectively, whereby an at least two-layer product exiting the merging section of the co-extrusion tool and having an upper lacquer layer, is produced in a single step.

2. A method according to claim 1, wherein a thermoplastic powder lacquer is used as a lacquer material.

3. A method according to claim 1, wherein at least one layer is formed of recycled material.

4. A method according to claim 3, wherein the recycled material contains a thermoplastic powder lacquer component.

5. A method according to claim 1, wherein the lacquer material is applied to a partial region of base layer formed of the base material.

* * * * *